Patented Mar. 27, 1923.

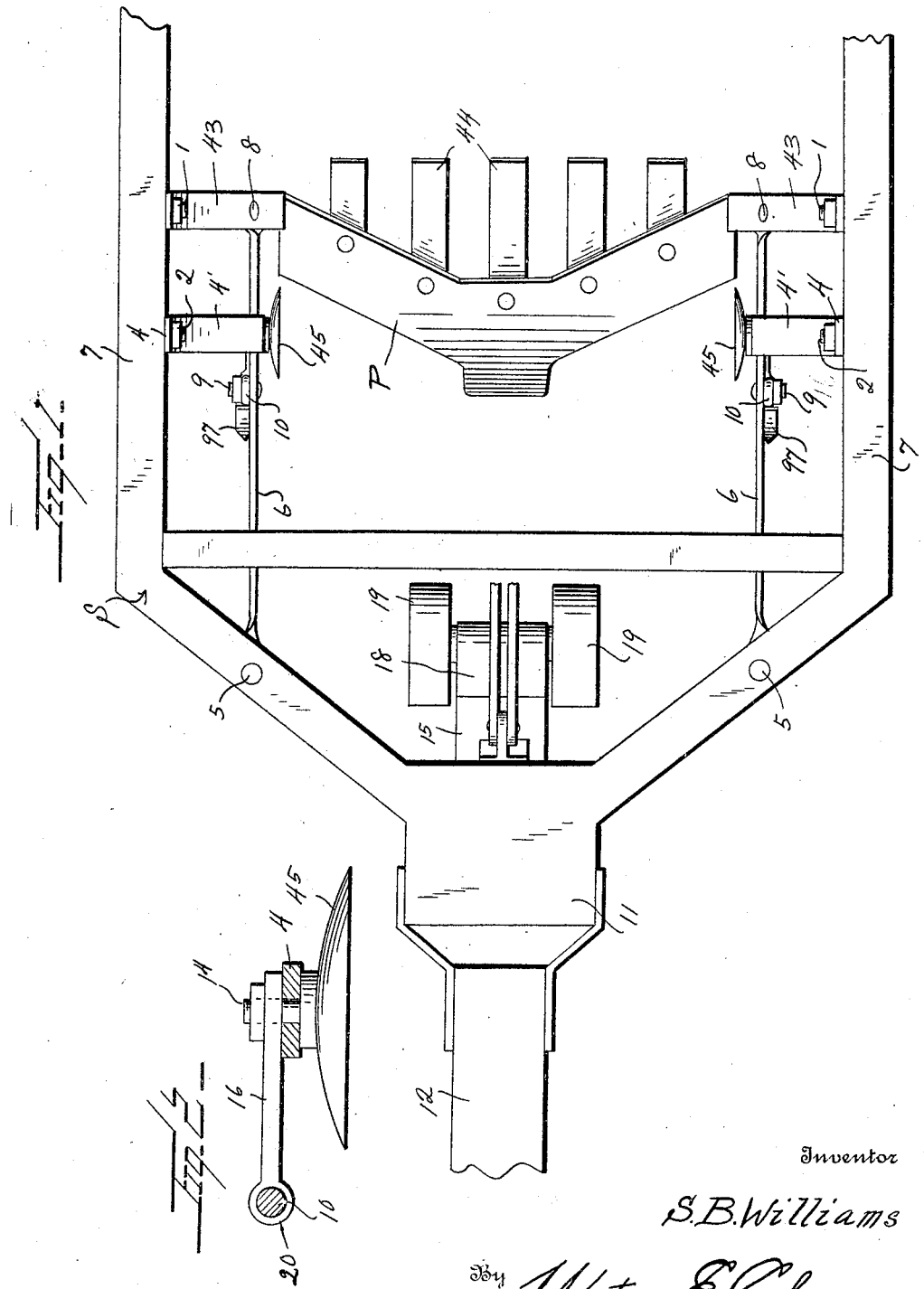

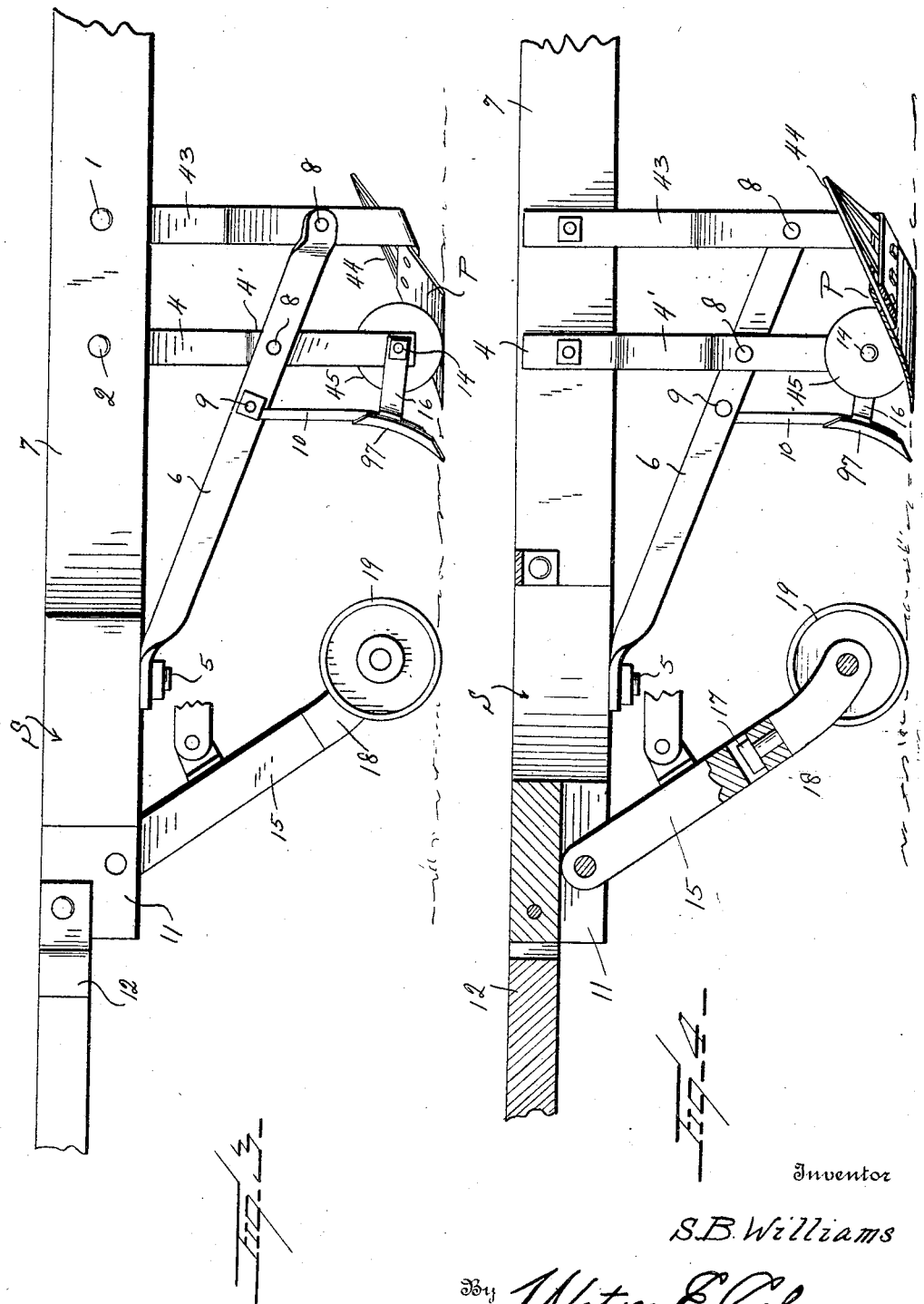

1,449,963

UNITED STATES PATENT OFFICE.

SPENCER B. WILLIAMS, OF PETERSBURG, VIRGINIA.

PLOW.

Application filed August 3, 1921. Serial No. 489,572.

*To all whom it may concern:*

Be it known that I, SPENCER B. WILLIAMS, a citizen of the United States, residing at Petersburg, in the county of Dinwiddie and State of Virginia, have invented certain new and useful Improvements in Plows, of which the following is a specification, reference being had to the accompanying drawings.

This invention relates to certain improvements in ground working members and has relation more particularly to a lifting plow especially designed and adapted for use in the harvesting of peanuts, potatoes and the like, and it is an object of the invention to provide novel and improved means whereby the ground engaging member or plow is mounted in a manner whereby the same may be drawn during the working operation with a minimum of pull or draft resistance.

The invention consists in the details of construction and in the combination and arrangement of the several parts of my improved lifting plow whereby certain important advantages are attained and the device rendered simpler, less expensive and otherwise more convenient and advantageous for use, as will be hereinafter fully set forth.

The novel features of my invention will hereinafter be definitely claimed.

In order that my invention may be the better understood, I will now proceed to describe the same with reference to the accompanying drawings, wherein:

Figure 1 is a view in top plan illustrating a lifting plow constructed and arranged in accordance with an embodiment of my invention.

Figure 2 is a fragmentary view partly in section and partly in elevation illustrating a portion of the mounting for certain of the supplemental ground working members as herein embodied:

Figure 3 is a view in side elevation of the structure as illustrated in Figure 1, and Figure 4 is a longitudinal vertical sectional view taken through the structure illustrated in Figure 1.

The ground working member or lifting plow and the associated structure as herein disclosed are particularly adapted for use in connection with a harvesting machine as set forth in my application Serial No. 489,571, filed on even date herewith, but it is to be understood that I do not wish to be understood as limiting myself in this respect.

As disclosed in the accompanying drawings, S denotes the forward end portion of a supporting frame which has the forward extremities of its side members 7 in converging relation and connected or united by the draft head or block 11. A suitable draft rigging 12 is adapted to be hitched to the head or block 11. Associated with the head or block 11 is a vertically swinging standard 15. In swivel connection, as at 17, with the lower end portion of the standard 15 is a truck 18, including the relatively small ground engaging wheels 19 arranged at opposite sides of the standards 15 when the frame is travelling straight ahead. The forward end portion of the frame S upon requisite swinging movement of the standard 15 may be raised or lowered as required.

P denotes a lifting plow which, as herein disclosed, is particularly adapted to penetrate the soil to an extent to permit the plow to pass under the peanuts and cut off the tap roots so that the soil does not lose the nitrogen contained within the roots. As herein disclosed, the plow P is substantially V-shaped in form with its apex forwardly directed and extending rearwardly from the plow P are the fingers 44 to facilitate the discharge of the lifted peanuts or the like together with the associated vines. Secured to the opposite end portions of the plow P are the lower extremities of the arms 43, the upper portions of said arms being bolted or otherwise suitably secured as at 1 to the side members 7 of the frame S. Bolted or otherwise secured, as at 2, to the side members 7 in advance of the arms 43 are the upper end portions of the depending arms 4. The central portions of the arms 4 are inwardly and downwardly inclined at at 4' so that the lower portions of the arms 4 will terminate in close proximity to the adjacent ends of the plow P.

Rotatably supported by the lower portions of the arms 4 and positioned inwardly thereof, are the disks 45, each of said disks being concavo-convex with its concave face inwardly disposed. Each of the disks 45 is positioned in advance of but in close proximity to the adjacent end of the plow P and the periphery or cutting edge of said disk 45 is substantially flush with the adjacent end of the plow. As the frame S advances, the disks 45, in addition to cutting the vines or the like, penetrate the soil to produce cuts whereby the lifting operation of the plow P is materially facilitated.

Bolted or otherwise secured, as at 5, to the undersurface of the converging portion of each of the side members 7 is an end portion of a rearwardly disposed brace member or strap 6. This member or strap 6 is disposed downwardly on a predetermined incline and is secured, as at 8, to the lower portions of the adjacent arms 43 and 4, hereinbefore referred to, whereby said arms 43 and 4 are effectively maintained in desired position. The members or straps 6 also assure a requisite draft being imposed upon the plow P as the frame S advances.

Bolted or otherwise secured, as at 9, to each of the straps or members 6, at a point in relatively close proximity to but in advance of the adjacent arm 4, is the upper end portion of a depending rod 10, and affixed to the lower end portion of the rod 10 is a shovel plow 97 or kindred ground working member, said plow or member 97 serving to throw the vines inwardly toward the path of travel of the plow.

Each of the disks 45 is mounted upon a supporting member 14 which is disposed through the lower end portion of an arm 4 and also through the rear end portion of a reinforcing or bracing member 16. The opposite or outer end portion of the member 16 is provided with an eye 20 through which the rod 10 is directed so that the member 16 effectively maintains the plow or kindred ground working member 97 in desired position.

From the foregoing description it is thought to be obvious that a lifting plow constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a frame, transversely spaced arms depending therefrom, a plow secured to the lower portions of the arms and positioned therebetween, a member secured to each of said arms and to the frame at a point in advance of the arm, an arm depending from the frame in advance of each of the first named arms and terminating in close proximity to an end of the plow, and a disk rotatably supported by the lower end portion of said last named arm, said last named arm being secured to one of the members.

2. In combination with a frame, transversely spaced arms depending therefrom, a plow secured to the lower portions of the arms and positioned therebetween, a member secured to each of said arms and to the frame at a point in advance of the arm, an arm depending from the frame in advance of each of the first named arms and terminating in close proximity to an end of the plow, a disk rotatably supported by the lower end portion of said last named arm, said last named arm being secured to one of the members, a rod depending from each of the members in advance of the second named arm, and a ground working member carried by the lower portion of said rod.

3. In combination with a frame, transversely spaced arms depending therefrom, a plow secured to the lower portions of the arms and positioned therebetween, a member secured to each of said arms and to the frame at a point in advance of the arm, an arm depending from the frame in advance of each of the first named arms and terminating in close proximity to an end of the plow, a disk rotatably supported by the lower end portion of said last named arm, said last named arm being secured to one of the members, a rod depending from each of the members in advance of the second named arm, a ground working member carried by the lower portion of said rod, and a reinforcing member connecting the lower end portions of each of said rods and the adjacent arm.

4. In combination with a frame, transversely spaced arms depending therefrom, a plow secured at the lower portions of said arms and positioned therebetween, a disk supported by the frame in advance of each side portion of the plow, and a ground working member positioned in advance of each of the disks.

5. In combination with a frame, transversely spaced arms depending therefrom, a plow secured at the lower portions of said arms and positioned therebetween, a disk supported by the frame in advance of each side portion of the plow, and means positioned in advance of each of the disks to turn vines into the path of the plow.

6. A device of the class described comprising, in combination, a supporting body, a lifting plow carried thereby, vine cutting means positioned in advance of each side of the plow, and means positioned in advance of each of the vine cutting means to turn the vines into the path of the plow.

In testimony whereof I hereunto affix my signature.

SPENCER B. WILLIAMS.